April 16, 1968 W. S. MORTLEY 3,378,793

DISPERSIVE DELAY CELLS

Filed Nov. 24, 1965

INVENTOR

Wilfrid Sinden Mortley

BY

Baldwin & Wight

ATTORNEYS

United States Patent Office 3,378,793

Patented Apr. 16, 1968

3,378,793
DISPERSIVE DELAY CELLS

Wilfrid Sinden Mortley, Great Baddow, England, assignor to The Marconi Company Limited, London, England, a British company
Filed Nov. 24, 1965, Ser. No. 509,538
Claims priority, application Great Britain, Nov. 30, 1964, 48,506/64
12 Claims. (Cl. 333—30)

ABSTRACT OF THE DISCLOSURE

A dispersive delay cell is provided including a cube-like body of fused quartz having, in one corner, an input signal device including an inter-leaved grating which propagates beams of waves of differing frequencies within a predetermined range of frequencies in differing frequency-dependent directions toward an extended wave reflector. The wave reflector includes a graded grating having line spacings which increase from one end thereof to the other. The reflector is formed on one edge surface of the cube-like body between two flat faces thereof. An output signal device is provided and includes an inter-leaved grating positioned in the further corner of the cube-like body to receive beams of waves reflected by the aforementioned reflector. The input and output signal devices and the reflector are disposed such that the frequency-dependent directions in which the beams of waves are propagated from the signal input device to the reflector lie in one plane and the directions in which the beams of waves are propagated from the reflector to the output signal device lie in a second plane. The total wave path length from input to output varies according to frequency to provide propagation times which similarly vary according to frequency.

Figure 1:
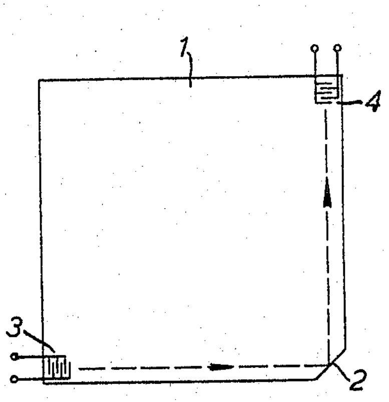

This invention relates to delay cells, that is to say, to devices in which waves—usually, though not necessarily, supersonic waves—are propagated in order to delay them.

The invention has for its object to provide improved delay cells which will produce results analogous to those produced, for electrical waves, by a dispersive electrical delay line. Different input frequencies fed into a dispersive electrical delay line are differentialy delayed by amounts dependent on those frequencies so that such a line can be used to produce from a relatively long input signal which sweeps in frequency between two limiting values of frequency, a much shorter output pulse in which all the input frequencies appear as modulation sidebands on a central carrier frequency. As will be seen later a delay cell in accordance with this invention can be used to produce an analogous result and for this reason, and for the sake of brevity, a delay cell in accordance with this invention will be hereinafter referred to as a dispersive delay cell.

There are many purposes, for example in certain radar systems and for certain spectrometers, in which it is required to convert a relatively long train of signals which sweep in frequency in predetermined manner (for example linearly) between two limiting values of frequency into a shorter pulse. Other cases arise in which it is required, oppositely, to convert a short pulse into a longer train of swept frequencies. There are various known ways of satisfying such requirements the most usual way, at the present time, being by means of a dispersive electrical delay line composed of lumped circuit elements. Such electrical delay lines are expensive, difficult to design to operate satisfactorily mainly because of inevitable losses in the coils in the lumped circuits and because of the large number of reactive elements employed in such lines with the consequent difficulty in avoiding the generation of false pulses due to periodic error in the line. Another known expedient which has been proposed is that of using an ultra-sonic wire line constructed to behave like a waveguide near its cut-off frequency. This expedient is, however, of limited application to relatively low frequencies because such wire lines cannot be made thin enough and of low enough attenuation to be useful at the higher frequencies which generally have to be dealt with. Moreover, the relation with frequency of the dispersion given by such lines is undesirably non-linear. The present invention seeks to avoid the defects of the known proposals above mentioned and to provide improve dispersive delay cells which will produce, from a relatively long frequency-swept signal applied at one electrode system of the cell, a much shorter output pulse which appears directly at an output electrode system of the cell there being no need for any extraneous frequency filtering. As will be apparent later a dispersive delay cell in accordance with this invention is reversible in the sense that it can be used not only to produce a short output pulse from a longer frequency-swept input pulse but also, if desired, to produce a long frequency-swept output signal from a shorter input pulse. For the sake of brevity, the invention will be hereinafter set forth and described on the assumption that it is to be used to produce a relatively short pulse from a relatively long frequency-swept input signal but it is to be understood that the invention is not limited to this particular use but may equally well be used to produce a relatively long frequency swept output signal from a relatively short input pulse.

According to this invention a dispersive delay cell comprises a body of wave propagating medium, input signal operated means for propagating beams of waves of different frequencies within a predetermined range of frequencies in different frequency-dependent directions in said body to different parts of an extended wave reflector and output signal means positioned to receive beams of waves reflected by said reflector, the whole arrangement being such that the wave path lengths from the input signal operated means via the reflector to the output signal means are different for different frequencies whereby different frequency-dependent wave-propagation times are provided by the cell.

Preferably the input and output signal means are constituted by interleaved gratings and the extended reflector is in the form of a graded grating with different parts thereof having different line spacings which are increased from one end of the extended reflector to the other.

Preferably also the arrangement is such that the frequency-dependent directions in which beams of waves are propagated from the input signal means to the reflector lie in a first plane and the frequency-dependent directions in which beams of waves are propagated from the reflector to the output signal means lie in a second plane, the reflector lying in a third plane which is inclined with respect to the first and second planes. In one embodiment of this nature the body is of slab-like form with parallel flat faces and one edge forming a surface on which the reflector is positioned and which is inclined to said flat faces, the input and output signal means being situated closely adjacent to two corners of the body.

Preferably coatings of wave absorbent material are provided on all surfaces of the body not occupied by the signal input or output means or the reflector.

The wave propagating medium may be solid, liquid, or even gas, depending upon design requirements, but is preferably solid.

The input and output signal means may be constituted by transducers separate from the body but in operative association therewith, the body being, in such case, merely a wave propagation body. Thus, for example, piezoelectric or magneto-strictive transducers in association with a wave propagating body of fused quartz could be used. It is, however, also possible to carry out the invention by making the body of such material that it will not only serve as a wave propagating body but also take part in the conversion of electrical signals into propagated waves and vice versa. In one embodiment of this nature the body material is of piezo-electric crystal, the input and output signal means are constituted by interleaved conductive gratings on external faces of the body and the reflector is constituted by a cylindrical surface on an external face of said body.

It is possible to make use of either longitudinal waves or transverse waves in carrying out this invention—indeed it is possible to use longitudinal waves over part of the frequency sweep and transverse waves over the remainder—but in general it is preferred to use transverse waves only and to eliminate longitudinal waves by making the spacing of interleaved lines of gratings used as input signal means less than half the wave length of the longitudinal mode of propagation at the highest frequency in the operating range.

The invention is illustrated in the accompanying drawings which are mutually perpendicular diagrammatic views of one embodiment. In the drawings the gratings in particular are shown purely diagrammatically their physical dimensions (they are constituted by very fine lines so closely spaced as to be in particular in the case of the input and output signal means, most difficult to see by the unaided eye) being such as to make it impossible to show them accurately by means of drawings without impractically great enlargement.

Figure 2:
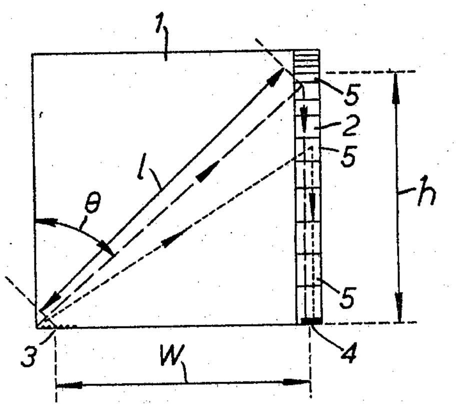

Referring to the drawings 1 is a slab-line body of ultrasonic wave propagating medium and has two flat parallel faces parallel to the plane of the paper in FIGURE 1 and a flat inclined edge 2 which, in the present embodiment, is at 45° to the plane of the paper in FIGURE 2. Signal input and output means 3 and 4 respectively are situated at the bottom left hand and top right corners (in FIGURE 1) of the body. They are constituted by transducers. In the figures they are represented as though they were constituted by inter-leaved comb-like closely spaced gratings of fine conductive lines directly on the body 1. If the body were of piezo-electric material they could be so constituted but it is at present preferred to use the body purely as a wave propagating material in which case the input and output signal means must, of course, be constituted by separate transducers in operative association with the body. The present preferred construction employs a body 1 of fused quartz—and transducers constituted by thin slips of quartz—preferably AC-cut or Y-cut—stuck-on to it by means of an indium bond and provided with deposited conductive gratings. For obvious reasons of difficulty of drawing no attempt is made to show this in FIGURES 1 and 2 where, as stated, the various gratings are purely diagrammatically represented. The "teeth" of the "combs" at 3 extend at right angles to those of the combs at 4.

On the 45° surface 2 is an extended reflector 5 constituted by a graded grating of parallel lines which extend at right angles to the two longer parallel edges of said 45° surface. The lines of the reflector grating may be but need not be conductive. They could, for example, be constituted by grooves of a depth of a quarter wave length or by deposited material of comparable mass, or by lines of a material such as Indium serving also to join a wave absorber plate or the like to the slab-like body 1. The line spacing is graded, increasing as indicated from one end of the reflector to the other. This grating also is purely diagrammatically indicated. As in the case of the gratings at 3 and 4 the actual number of lines is far too large and the spacing at the closely spaced end is far too small to be shown correctly in a drawing of reasonable size.

The dimensions of the input signal means—i.e. the number and spacing of the lines thereof—are so chosen in accordance with principles employed in radio aerial array design and in accordance with the Equation 1 appearing hereinbelow, that, if an input signal of a frequency between predetermined limits is applied thereto, it produces a sharp beam of waves in the body 1. It acts in a manner analogous to that of a radio aerial array projecting a radio beam. For purposes of explanation it will be assumed that the signal means is a point source and the beam is a mere ray. In practice the departure from this assumption is not very great. All directions of the beam will lie in the plane of the paper in FIGURE 2 and the angle $\theta$ (see FIGURE 2) at which it is projected will be determined by the equation $$\lambda/2d = \sin \theta \qquad (1)$$

where $\lambda$ is the length of the wave in the body 1 and $d$ is the spacing between a "tooth" in one of the two inter-leaved combs at 3 and the "teeth" on either side thereof, of the other comb.

The broken line from the signal means 3 to the reflector 5 in FIGURE 2 represents the path of a ray produced by application of a particular frequency $f$ to the signal 3. The length $l$ of this path is given by $$l = \frac{w}{\sin \theta} = \frac{2wd}{\lambda} \qquad (2)$$

where $w$ is, as indicated in FIGURE 2, the shortest distance between the point source assumed for the input signal means 3 and a line to which it is assumed, for present purposes, the reflector 5 approximates.

Since $\lambda = c/f$ where $c$ is the velocity of wave propagation in the body 1

$$l = \frac{2wdf}{c} \qquad (3)$$

and the propagation time $t$ over the path of length $l$ is given by $$t = \frac{2wdf}{C^2} \qquad (4)$$

If, therefore, $c$ is constant, $t \propto f$.

The projected ray, of length $l$, will obviously meet the reflector at a distance $h$ from the output signal means 4 dependent on the angle $\theta$ (which is in turn dependent on $f$) and will be reflected, out of the plane of the paper in FIGURE 2, to said output signal means.

$$h = w \cot \theta \qquad (5)$$

and $$h = w\sqrt{\left(\frac{2d^2f^2}{C^2} - 1\right)} \qquad (6)$$

It may be shown that the spacing $\lambda_r$ along the length of the reflector, or the fronts of waves of different frequencies from 3 is given by $$\lambda_r = 2d_r = \frac{2d\lambda}{\sqrt{4d^2 - \lambda^2}} \qquad (7)$$

where $d_r$ is the spacing of the reflector grating lines at the place where the wave front considered is incident Substituting $c/f$ for $\lambda$ we get, from Equation 6

$$d_r = \frac{dw}{h} = d \tan \theta \qquad (8)$$

If, therefore, the spacing of the lines of the graded grating of reflector 5 satisfies Equation 8 above, the reflector will reflect any ray from signal input means 3 and of a frequency between the predetermined limits for which the cell is designed, to the signal output means 4 and the delay to which that frequency is subject will be $2l/c$. FIGURE 2 shows, in broken lines, a complete path from 3 to 4 via 5 for one frequency and, in dotted lines, a similar, but shorter complete path for a lower frequency.

It is preferred, in carrying out the invention to make use of transverse waves to provide the delays. If an alternating voltage is applied to the interleaved combs of a transducer such as the transducer used as the input signal means, a longitudinal wave is emitted and if this is incident upon a surface in an isotropic solid, part of its energy is transformed into a transverse wave at a lower velocity and emitted at an angle determined by the equation of Snell's Law which is $$\frac{\text{Sin } \theta_L}{V_L} = \frac{\text{Sin } \theta_T}{V_T} \quad (9)$$

where $\theta_L$ and $\theta_T$ are, respectively, the longitudinal wave and transverse wave angles and $V_L$ and $V_T$ are respectively the longitudinal wave and transverse wave velocities. If the grating 3 were inside the body 1 waves would be radiated (for any given frequency inside the range considered) in four directions, two of them being longitudinal waves and the other two transverse. Since the grating 3 is on the surface of the body 1 (or, in effect, on the surface) we have only two waves to consider, one longitudinal and the other transverse. Obviously, it is undesirable to have two waves present simultaneously and it is preferred, in carrying out the invention, to get rid of the longitudinal wave. This may be done by so arranging matters that the angle of the longitudinal wave always exceeds the critical angle $\theta$ for transformation by setting Sin $\theta_L=1$ in Equation 9 above. Then $$\text{Sin } \theta_C = V_T/V_L \quad (10)$$

With fused quartz $V_T/V_L=0.631$ and therefore $\theta_c=39° 3'$ A practical quantitative example with fused quartz as the material of the wave propagating body 1 will now be given. If $F_M$ is the highest frequency in the working range and if it be assumed that it will be emitted at the angle $\theta_c=39° 3'$ the closest grating spacing in the graded reflector grating will be the value $d_{rM}$ of $d_r$ associated with this angle and the smallest practical value of $d_{rM}$ will limit the maximum frequency which can be used. Assume the smallest practical value of $d_{rM}$ to be one thousandth of an inch, although much closer spacings are, in fact, used nowadays in spectrographic diffraction gratings. Then from Equation 8

$$d_{rM}=0.001234 \text{ inch} \quad (11)$$

From Equation 1, substituting $c/f$ for $\lambda$ we get $$f_M=\frac{c}{2d_{rM} \text{ Sin } \theta} \quad (12)$$

The velocity of transverse waves in fused quartz in $1.48\times10^5$ inches/sec. and we get, therefore, $$f_M=\frac{1.48\times10^5}{2\times1.234\times10^{-3}\times0.631} \doteqdot 9.5\times10^7 \text{ c./s.} \quad (13)$$

The absolute minimum frequency which can be handled is obviously that for which $\theta$ (FIGURE 2) is 90° i.e. for which Sin $\theta$ in Equation 12 is unity. Using the foregoing figures this frequency is:

$$0.631\times9.5\times10^7 \doteqdot 6\times10^7 \text{ c./s.}$$

The theoretical frequency range (sweep) is then $(9.5-6)\times10^7$ c./s.=35 mc./s. and the centre frequency $f_c$ is 95+60/2=77.5 mc./s.

For practical reasons the sweep of the input signals should not extend right up to the theoretical limits. A practical figure for the sweep $f_D$ is 90% of the frequency interval between the theoretical maximum and minimum frequencies. With the foregoing figures this gives $$f_D=.9\times35=31.6 \text{ mc./s.}$$

with a lowest frequency of 61.7 mc./s. (with a value of $\theta$ of 76° 42′) and a highest frequency of 93.3 mc./s. (with a value of $\theta$ of 40°).

The dimensions of the body 1 will depend upon design requirements. If, for example, the rate of frequency sweep required to be handled is 1 mc./s. per $\mu$sec. the difference between the delays to which the highest and lowest frequencies must be subjected (i.e. the delay differential T) is 31.6 $\mu$sec. Equation 4 above gives the actual delay, from input signal means 3 to reflector 5 for a given frequency.

Assuming the length of the path from reflector to output signal means 4 is the same, at any frequency, as the length of the path from 3 to 5 for that frequency Equation 4 gives half the total delay at that frequency. If $t_{max.}$ and $t_{min.}$ are the delays given by Equation 4 at the two limiting frequencies $$T=2(t_{max.}-t_{min.})=\frac{4wdf_D}{c^2} \quad (14)$$

whence $$w=\frac{c^2T}{4df_D} \quad (15)$$

which, taking the foregoing figures, gives $$w=\frac{1.48^2\times10^{10}\times3.16\times10^{-5}}{4\times1.234\times10^{-3}\times3.16\times10^7}=4.44 \text{ inches}$$

and a maximum value of $h$ of $4.44\times1.234=5.48$ inches. The dispersion factor D is $f_DT=1000$.

Instead of eliminating the longitudinal wave it is, of course, possible to make use of it and eliminate the transverse wave as far as possible by ultra-sonic absorption. Clearly this will enable higher frequencies to be reached though increase in the ratio of sweep frequency to centre frequency will be accompanied by increase in interference from the transverse wave. Because the highest frequencies are obtained with the largest values of the angle $\theta$, the increase in attainable frequency is equal to the ratio of the propagation velocity for the longitudinal wave to that for the transverse wave and the maximum sweep under the assumed conditions may therefore be taken as $$f_D(V_L/V_T)\approx50 \text{ mc./s.}$$

However it is, in general, preferred to use the transverse wave and suppress the longitudinal one as already described because with the longitudinal wave, the amount of energy in the wave changes with the value of angle $\theta$ (and therefore with frequency) and becomes zero in the neighborhood of 45° or 46°. Ordinarily this feature will be regarded as objectionable but in cases in which it can be accepted it is possible so to arrange matters as to use the longitudinal wave for the higher frequencies and to use the transverse wave for the lower frequencies. In this way it is possible, under the conditions assumed, to obtain a total sweep coverage of more than 80 mc./s.

It should be pointed out that the grating constituting the input signal means 3 in FIGURE 1 should be close up against the bottom left hand corner (in FIGURE 2) though, for obvious reasons of drawing difficulties, the drawings do not show this clearly. The grating should be so positioned that there is produced, in effect, a second or virtual grating which is the mirror image of grating 3, is co-planar therewith and is on the other side of the edge from which, in FIGURE 2, the angle $\theta$ is measured. The co-operation of the actual grating with the mirror image virtual grating increases the efficiency. Spacing of the actual grating 3 from the adjacent corner should be avoided because if this is present there will be a second beam emitted from the grating at the same angle to the normal to the grating as the first beam but on the other side of said normal. This second beam would be reflected from the edge from which in FIGURE 2, $\theta$ is measured and would be parallel to the first beam, but displaced therefrom by an amount dependent on the spacing of the grating 3 from the edge in question. Obviously this second beam would cause interference and have to be eliminated by ultrasonic absorption.

As regards the reflector grating 5, it will be apparent that there will be a loss of about half the beam energy by specular reflection. Indeed rather more than half the beam energy may, in practice, have to be lost so as to reduce third and fifth time of travel signals to acceptably low levels. In this connection it should be noted that third time of travel signals will not be compressed i.e. will not reach the output means 4 as a shortened pulse. Required loss at the reflector grating 5 may be introduced by making the length of the lines thereof short, thus producing a wider reflected beam and increased loss as a result of beam spread. Undesired ultra-sonic energy—i.e. wave energy following paths other than those required for the dispersive effect—should be absorbed as far as possible by coating all surfaces of the body 1 not occupied by gratings with ultra-sonic absorbent material such as solder, pitch or metal loaded resinous material. These coatings are not shown in the drawings.

Another way of making use of the second radiated beam and of its received image is by absorbing the backward rays. This will result in loss of about three quarters of the output power but by improving the efficiency of reflector at the reflecting grating this may be offset to some extent. This way of making use of the second radiated beam and of its received image has the advantage that less precise location of the transducer gratings is required. The delay medium surfaces may be cut at such angles that the unwanted beams (both transmitted and received) are multiply reflected between surfaces coated with supersonic wave absorbent material.

The beam widths of the transducers 3 and 4 are not critical but will be near optimum if the total number $n$ of conductive lines in a transducer is given by $$n=D=(f_D T) \tag{16}$$

It should be understood that the particular figures and dimensions given hereinbefore are by way of explanatory example only and in no sense limiting.

I claim:

1. A dispersive delay cell comprising a body of wave propagating medium, an extended wave reflector, input signal operated means for propagating beams of waves of different frequencies within a predetermined range of frequencies in different frequency-dependent directions in said body to different parts of said extended wave reflector, and output signal means positioned to receive beams of waves reflected by said reflector, said extended wave reflector comprising means lying in the path of the waves being propagated in differing frequency dependent directions for reflecting said waves to the output signal means, the wave total path lengths from the input signal operated means via the reflector to the output signal means being different for different frequencies whereby different freqeuncy-dependent wave-propagation times are provided by the cell.

2. A cell as claimed in claim 1 wherein the input and output signal means comprises interleaved gratings and the extended reflector comprises a graded grating with different parts thereof having different line spacings which are increased from one end of the extended reflector to the other.

3. A cell as claimed in claim 1 wherein the input and output signal means comprise transducers separate from the body but in operative association therewith, the body being merely a wave propagation body.

4. A cell as claimed in claim 3 comprising input and output signal transducers separate from and in association with a wave propagating body of fused quartz.

5. A cell as claimed in claim 1 wherein the frequency-dependent directions in which beams of waves are propagated from the input signal means to the reflector lie in a first plane and the frequency-dependent directions in which beams of waves are propagated from the reflector to the output signal means lie in a second plane, said reflector lying in a third plane which is inclined with respect to the first and second planes.

6. A cell as claimed in claim 5 wherein the body is of slab-like form with parallel flat faces and one edge forming a surface on which the reflector is positioned and which is inclined to said flat faces, the input and output signal means being situated closely adjacent to two corners of the body.

7. A cell as claimed in claim 1 wherein coatings of wave absorbent material are provided on all surfaces of the body not occupied by the signal input or output means or the reflector.

8. A cell as claimed in claim 2 wherein the body material is of piezo-electric crystal, said input and output signal means comprising interleaved conductive gratings on external faces of the body and said reflector comprising a cylindrical surface on an etxernal face of said body.

9. A cell as claimed in claim 1 wherein the waves are transverse waves.

10. A cell as claimed in claim 2 wherein longitudinal waves are substantially eliminated by making the spacing of interleaved lines of gratings used as input signal means less than half the wave length of the longitudinal mode of propagation at the highest frequency in the operating range.

11. A dispersive delay cell comprising a body of wave propagating medium, input signal means including wave initiation means for initiating the propagation of waves within said body and for causing the direction of propagation to vary as a function of the frequency of input signals applied to said input signal means, output signal means, extended wave reflector means lying in the paths of the waves being propagated in frequency determined directions for reflecting said waves to the output signal means, said output signal means separate from said wave propagating means comprising means lying in the path of the reflected waves for producing output signals in response to the reception of reflected waves from said extended reflector means.

12. A dispersive delay cell according to claim 11 wherein said paths of waves from said wave initiation means vary angularly in dependance upon the frequency of input signals applied to said input signal means.

References Cited

UNITED STATES PATENTS

| | | | |
|---|---|---|---|
| 3,300,739 | 1/1967 | Morley | 330—30 |
| 3,304,520 | 2/1967 | Auld | 330—30 |

ROY LAKE, *Primary Examiner.*

DARWIN R. HOSTETTER, *Examiner.*

Disclaimer 3,378,793.—*Wilfrid Sinden Mortley*, Great Baddow, England. DISPERSIVE DELAY CELLS. Patent dated Apr. 16, 1968. Disclaimer filed Dec. 29, 1969, by the assignee, *The Marconi Company Limited.*

Hereby enters this disclaimer to claims 1, 3, 4, 7, 9, 11 and 12 of said patent.

[*Official Gazette March 31, 1970.*]